Oct. 7, 1941.    J. M. SHIMER    2,258,267
HIGH SPEED THRUST BEARING
Filed Jan. 3, 1940    2 Sheets-Sheet 1

Inventor:
JOHN M. SHIMER,
by: John E. Jackson
his Attorney.

Oct. 7, 1941.  J. M. SHIMER  2,258,267
HIGH SPEED THRUST BEARING
Filed Jan. 3, 1940   2 Sheets-Sheet 2
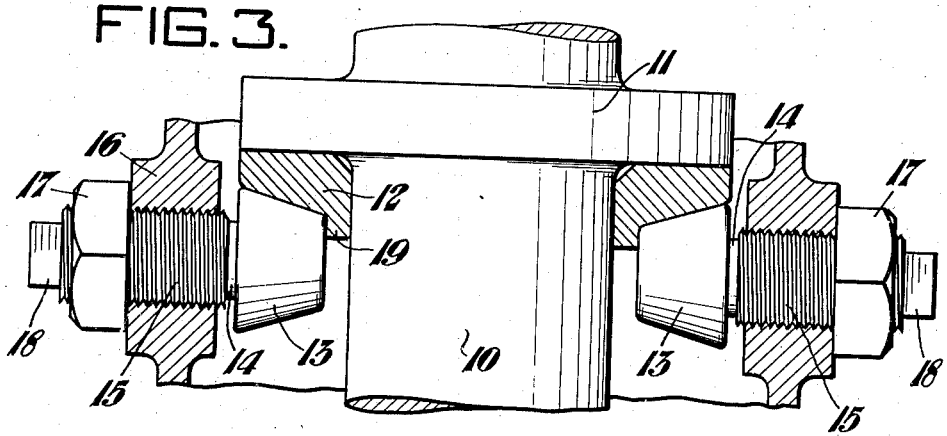
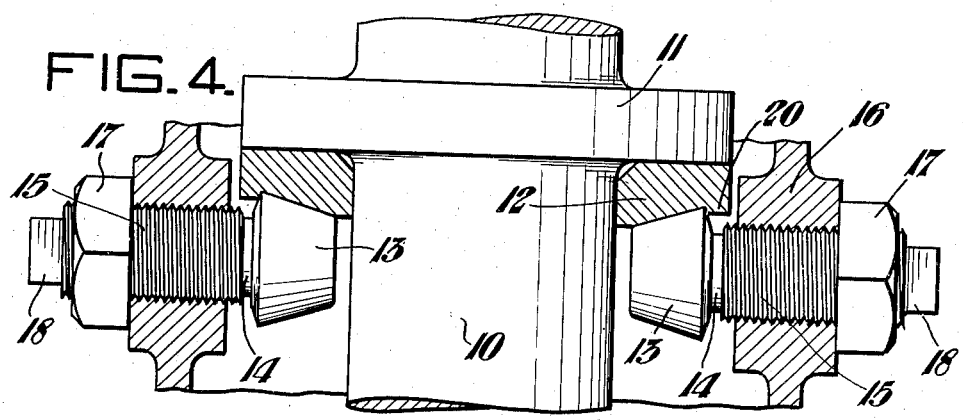
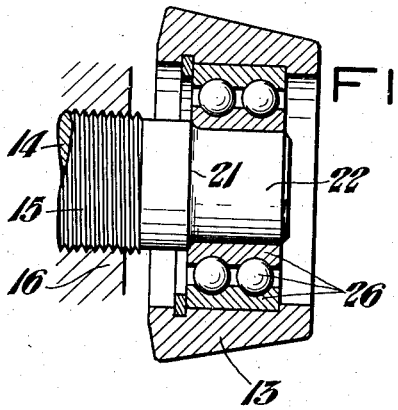
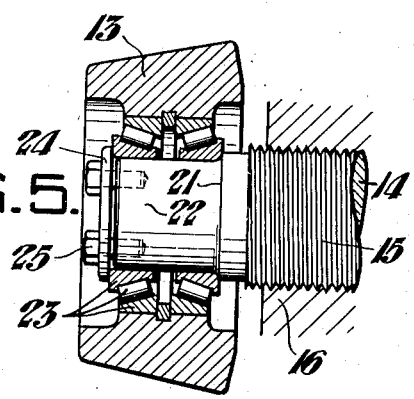
Inventor:
JOHN M. SHIMER,
by: John E. Jackson
his Attorney.

Patented Oct. 7, 1941

2,258,267

UNITED STATES PATENT OFFICE 2,258,267

HIGH SPEED THRUST BEARING

John M. Shimer, Dallas, Tex., assignor to Oil Well Supply Company, a corporation of New Jersey Application January 3, 1940, Serial No. 312,275

4 Claims. (Cl. 308—231)

This invention aims to provide an improved antifriction thrust bearing characterized by the provision of a single race peculiarly well suited for use in taking the thrust of heavy-duty large diameter shafts rotating at high speeds.

Among the objects of the invention are: to provide a unidirectional thrust bearing with but a single race; to provide a bearing including thrust rolls which do not partake of rotary motion in a plane about the rotating load-carrying shaft; to provide a thrust bearing for a high speed rotating shaft in which the destructive action of centrifugal force of the balls or rollers on their respective races has been eliminated; to provide a thrust bearing which has no sliding effect, and to eliminate one of the thrust races such as those customarily found in conventional thrust bearings.

For a more complete understanding of the objects and advantages of the present invention, reference should be made to the following detailed description, the accompanying drawings, and the appended claims.

In the drawings,

Figure 3 is a view illustrating a modification of the invention wherein the thrust bearing is arranged to take the load from a vertically disposed shaft;

Figure 4 is a view similar to Figure 3 but illustrating a further modification;

Figure 5 is an enlarged detail view showing the mounting, illustrating one of the thrust rollers and its roller bearing mounted on an adjustable stationary supporting stud, and Figure 6 is a view similar to Figure 5 but showing the thrust roller carried by a ball bearing secured to a fixed supporting stud.

Figure 1:
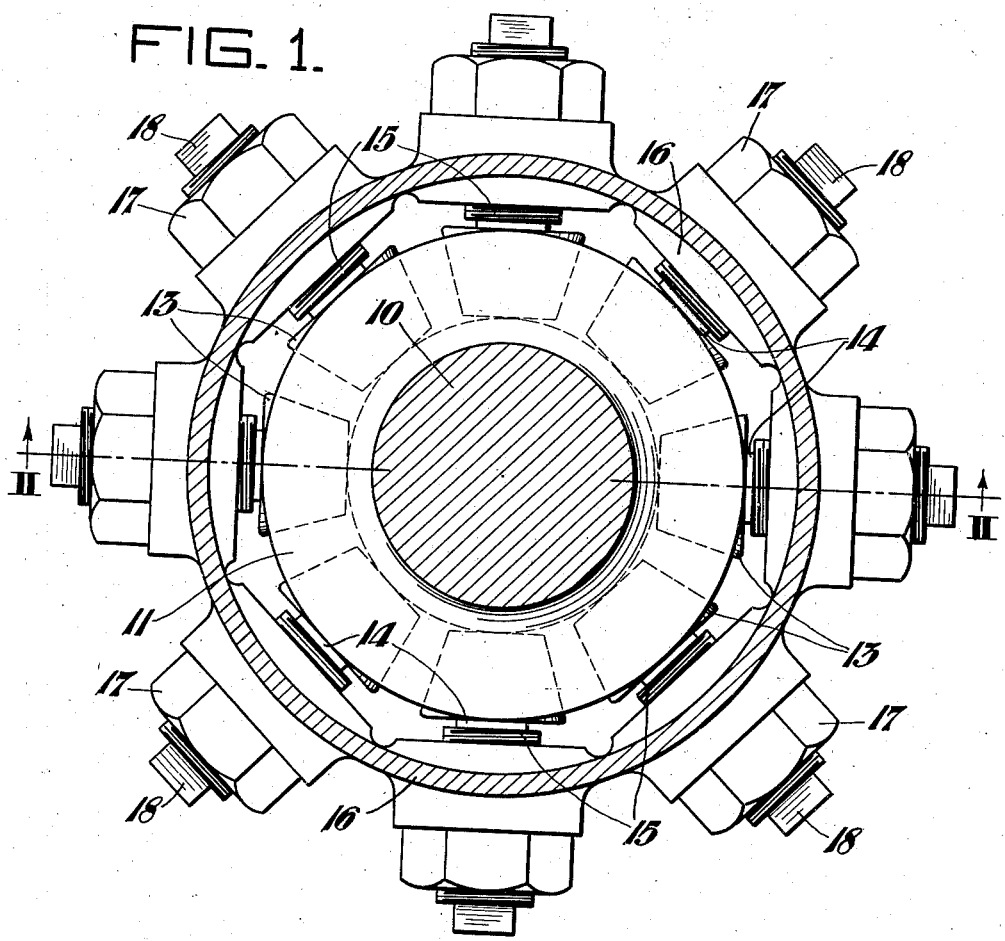
Figure 1 is an end view of a thrust bearing exemplifying the present invention.

Referring in detail to the drawings, a power shaft 10 has suitably formed thereon a collar 11 which serves as an abutment for a thrust race ring 12. A tapered frusto-conical surface 12ª of the race ring coacts with a plurality of frusto-conical thrust rollers 13 each of which is rotatably mounted on a fixed stud 14 the exterior of which is threaded at 15 so as to permit each thrust roller to be adjusted axially toward or from the axis of the shaft 10. This positioning movement provides initially for precision adjustment of the thrust rollers and also permits adjustment to compensate for wear during the life of the bearing. The stationary studs 14 are threaded through tapped openings in the bearing housing 16, and said studs are locked in their adjusted position by jam nuts 17. The extremities of the studs are provided with squared portions 18 for coaction with a suitable wrench or adjusting tool.

In the embodiment of the invention illustrated in Figure 3, the thrust ring 12 is provided with an inner annular shoulder 19 adjacent the shaft 10. The provision of this shoulder enables the race ring to take radial thrusts as well as thrusts in the direction of the axis of the shaft 10. In the modification of Figure 4 there is an outer shoulder 20 which serves a function similar to that of the shoulder 19. It is to be understood, however, that if desired, the shoulders 19 and 20 may be dispensed with because inherently the coaction between the frusto-conical thrust rollers 13 and the race ring 12 provides for taking both radial and axial thrusts of the shaft 10. The shoulders, however, provide for taking such thrusts even after an appreciable amount of wear has occurred.

Figure 2:
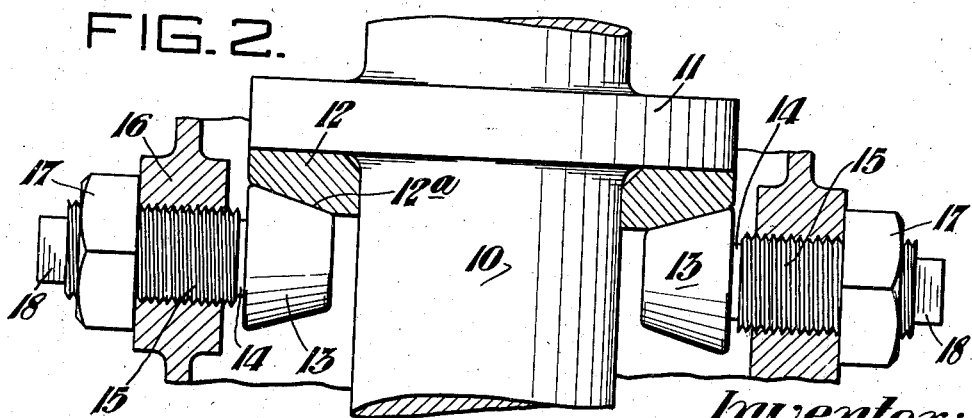
Figure 2 is a sectional view taken on line II—II of Figure 1.

Figure 2 shows a thrust ring 12 without the shoulders. The construction of Figures 1 and 2 is otherwise substantially the same as that illustrated in Figures 3 and 4. Comparison of the various constructions illustrated will make it self-evident that the thrust bearing of the present invention is suitable for use in connection with either horizontally or vertically disposed shafts.

As shown in Figure 5, the stationary adjustable bearing roller supporting stud 14 is shouldered down at 21 to provide a shank 22 of reduced diameter to receive a roller bearing of known design, indicated generally at 23, which provides an antifriction mounting for the frusto-conical thrust roller 13. A suitable retaining washer 24 is secured to the end of the shank 22 by bolts 25, as shown.

Figure 6 illustrates an alternative antifriction mounting for the thrust rollers wherein a conventional type of ball bearing 26 is interposed between the shank 22 of the stationary supporting stud and the interior bore of the thrust roller 13.

From consideration of the foregoing disclosure, it is apparent that the invention provides a thrust bearing in the form of the truncated cone rollers which partake of a pure rolling action free from any sliding effect with respect to the single thrust race ring 12. It is also manifest that the invention provides adjustable means whereby correct alignment of the truncated cone thrust bearing members 13 with respect to the thrust race ring 12 can be readily secured. An advantage of the thrust bearing of the character described and herein claimed is that it overcomes the detrimental action of centrifugal force which is present in conventional types of thrust bearings, wherein the rolling members thereof are located between two races and revolve with the revolving shaft. When conventional thrust bearings of large shafts rotate at high speeds, the destructive effect of centrifugal force is a vital factor which lessens the useful life of such conventional bearings. Since in the bearing of the present invention neither the thrust rollers nor the supports therefor rotate with the shaft, the detrimental centrifugal forces are eliminated. This results in advantageously lengthening the useful life of the improved bearing.

While I have described quite specifically certain physical embodiments of the invention herein illustrated, it is to be understood that various modifications and substitutions of equivalents may be made by those skilled in the art without departure from the invention as defined in the appended claims.

I claim:

1. An antifrictional thrust and steadying bearing for use with a large diameter high speed shaft comprising a single race, an outer annular shoulder on said race, a plurality of stationary radial studs equally spaced about said shaft throughout its circumference, and a plurality of frusto-conical bearing members, each of said bearing members mounted on said stationary studs, said studs being radially adjustable so that the frusto-conical bearing members are maintained in cooperative relationship with the race shoulder.

2. An antifrictional thrust and steadying bearing for use with a large diameter high speed shaft comprising a single race, an inner annular shoulder on said race, a plurality of stationary radially and adjustable studs equally spaced about said shaft throughout its circumference, and a plurality of frusto-conical bearing members, each of said bearing members being mounted on a respective one of said stationary studs, said frusto-conical bearing members being maintained in cooperative relationship with said race shoulder.

3. An antifrictional thrust and steadying bearing for use with a large diameter high speed shaft comprising a single race, an inner annular shoulder on said race, a plurality of stationary radially and adjustable studs equally spaced about said shaft throughout its circumference, a plurality of frusto-conical bearing members, and antifriction bearings mounted between said studs and bearing members, each of said bearing members being rotatably mounted on said stationary studs, said bearing members being maintained in cooperative relationship with said race shoulder.

4. An antifrictional thrust and steadying bearing for use with a large diameter high speed shaft, including a single bearing race, an annular shoulder on said race, a plurality of stationary radial studs equally spaced about said shaft throughout its circumference, and a plurality of frusto-conical bearing members mounted on said stationary studs, said studs being radially adjustable to maintain the frusto-conical bearing members in cooperative relationship with the shoulder of said race.

JOHN M. SHIMER.